(12) United States Patent
McGrory et al.

(10) Patent No.: US 12,703,422 B2
(45) Date of Patent: Aug. 11, 2026

(54) SYSTEM AND METHOD OF LANE CENTERING CONTROL WITH ACTIVE REAR STEERING

(71) Applicant: GM Global Technology Operations LLC, Detroit, MI (US)

(72) Inventors: Jackson Barry McGrory, Mississauga (CA); Brian Porto, Wixom, MI (US); Mohammadali Shahriari, Markham (CA); Reza Zarringhalam, Whitby (CA); Philip Mallinger, Shelby Township, MI (US); Ashraf Abualfellat, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 18/663,613

(22) Filed: May 14, 2024

(65) Prior Publication Data

US 2025/0353544 A1 Nov. 20, 2025

(51) Int. Cl.
*B62D 5/04* (2006.01)
*B60W 10/20* (2006.01)
(Continued)

(52) U.S. Cl.
CPC ........... *B62D 5/0463* (2013.01); *B60W 10/20* (2013.01); *B62D 6/002* (2013.01); *B62D 7/09* (2013.01);
(Continued)

(58) Field of Classification Search
CPC ........ B62D 5/0463; B62D 6/002; B62D 7/09; B62D 7/14; B62D 7/15; B62D 7/1509;
(Continued)

(56) References Cited

U.S. PATENT DOCUMENTS 4,679,809 A * 7/1987 Ito .......................... B62D 7/159 180/408
4,720,790 A * 1/1988 Miki ...................... B62D 7/159 701/41
(Continued)

FOREIGN PATENT DOCUMENTS

DE 102012212301 A1 1/2013
DE 102013200132 A1 7/2013
(Continued)

*Primary Examiner* — Lindsay M Low
*Assistant Examiner* — Brian R Kirby
(74) *Attorney, Agent, or Firm* — Honigman LLP; Matthew H. Szalach

(57) ABSTRACT

A computer-implemented method that, when executed by data processing hardware, causes the data processing hardware to perform operations comprising determining a desired effective steering angle based on a desired path, measuring a front road wheel angle and a rear road wheel angle, determining an actual effective steering angle, determining an effective steering angle error based on the desired effective steering angle and the actual effective steering angle, generating a torque command for an electronic power steering system based on the effective steering angle error, and controlling an active rear steering system independently from the electronic power steering system.

20 Claims, 6 Drawing Sheets

(51) Int. Cl.

| | |
|---|---|
| ***B62D 6/00*** | (2006.01) |
| ***B62D 7/09*** | (2006.01) |
| ***B62D 7/14*** | (2006.01) |
| ***B62D 7/15*** | (2006.01) |
| ***B62D 15/02*** | (2006.01) |

(52) U.S. Cl.
CPC ................. *B62D 7/14* (2013.01); *B62D 7/15* (2013.01); *B62D 7/1509* (2013.01); *B62D 7/1545* (2013.01); *B62D 15/025* (2013.01); *B62D 15/0255* (2013.01); *B62D 15/026* (2013.01)

(58) Field of Classification Search
CPC ................ B62D 7/1545; B62D 15/025; B62D 15/0255; B62D 15/026; B60W 10/20
See application file for complete search history.

(56) References Cited

U.S. PATENT DOCUMENTS

| | | | | | |
|---|---|---|---|---|---|
| 4,884,647 | A * | 12/1989 | Mimuro | B62D 7/1581 | 701/41 |
| 4,926,954 | A * | 5/1990 | Ataka | B62D 7/14 | 701/41 |
| 4,967,865 | A * | 11/1990 | Schindler | B62D 7/159 | 180/408 |
| 5,123,496 | A * | 6/1992 | Kashihara | G01D 5/2497 | 701/41 |
| 8,903,607 | B2 * | 12/2014 | Lee | B62D 15/0255 | 180/408 |
| 2002/0007239 | A1 * | 1/2002 | Matsumoto | B60W 30/02 | 701/41 |
| 2009/0118907 | A1 * | 5/2009 | Joe | B60W 10/20 | 701/42 |
| 2009/0157263 | A1 * | 6/2009 | Shin | B62D 5/0481 | 701/43 |
| 2011/0106382 | A1 * | 5/2011 | Kageyama | B62D 6/04 | 701/42 |
| 2012/0197496 | A1 * | 8/2012 | Limpibunterng | B62D 1/286 | 701/42 |
| 2013/0179036 | A1 * | 7/2013 | Lee | B62D 15/0255 | 701/41 |
| 2014/0229068 | A1 * | 8/2014 | Ueyama | B60W 10/20 | 701/41 |
| 2014/0229072 | A1 * | 8/2014 | Kang | B62D 7/159 | 701/42 |
| 2023/0011747 | A1 * | 1/2023 | Muenster | B62D 6/002 | |

FOREIGN PATENT DOCUMENTS

| | | | | |
|---|---|---|---|---|
| DE | 102015212229 | A1 | 1/2017 | |
| KR | 20200136276 | A * | 12/2020 | B62D 15/0285 |

* cited by examiner

SYSTEM AND METHOD OF LANE CENTERING CONTROL WITH ACTIVE REAR STEERING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a method of controlling steering of a vehicle and, more particularly, controlling a vehicle having an advanced driver assistance system and an active rear steering system.

In general, vehicles are equipped with an advanced driver assistance system (ADAS) for maintaining control of the vehicle during both manual and automated driving. Some of the vehicles are also equipped with an active rear steering (ARS) system. Active rear steering can improve turning radius and maneuverability of the vehicle by turning the rear wheels in a direction that is opposite that of the front wheels. Additionally, active rear steering can provide smooth lane changing and improve stability at high speeds by turning the rear wheels in the same direction as the front wheels. In existing systems, the ADAS cannot command a rear steering angle of the active rear steering system. Thus, when the ADAS is controlling the vehicle during manual or automated driving, the rear steering angle is forced to zero to simplify control of the vehicle. The present disclosure will address one or more shortcomings of existing systems and methods.

SUMMARY

In one configuration, a computer-implemented method that, when executed by data processing hardware, causes the data processing hardware to perform operations is provided. The operations include determining a desired effective steering angle based on a desired path of a vehicle, measuring a front road wheel angle and a rear road wheel angle, determining an actual effective steering angle, determining an effective steering angle error based on the desired effective steering angle and the actual effective steering angle, generating a torque command for an electronic power steering system based on the effective steering angle error, and controlling an active rear steering system independently from the electronic power steering system.

The method may include one or more of the following optional aspects or steps. For example, the rear road wheel angle may be a low resolution rear road wheel angle. The method can further include measuring a hand wheel angle. The method can further include estimating a high resolution rear road wheel angle using the low resolution rear road wheel angle, the hand wheel angle, and a predictive ratio. Determining the actual effective steering angle can further include evaluating a difference between the front road wheel angle and the high resolution rear road wheel angle.

According to at least one aspect, determining the actual effective steering angle can further include evaluating a difference between the front road wheel angle and the rear road wheel angle.

According to another aspect, determining the effective steering angle error can further include determining a difference between the desired effective steering angle and the actual effective steering angle.

According to at least one example, the active rear steering system can be configured to be selectively controlled while an advance drive assistance system is enabled. Controlling the active rear steering system can further include disabling the active rear steering system if the advanced driver assistance system is enabled and either: (i) a rear road wheel angle is less than a first threshold or (ii) the vehicle has a velocity less than a second threshold.

According to another example, the method further includes adjusting the front road wheel angle of one or more front wheels of the vehicle based on the torque command.

According to another configuration, a system is provided and includes data processing hardware and memory hardware in communication with the data processing hardware, the memory hardware storing instructions that, when executed on the data processing hardware, cause the data processing hardware to perform operations. The operations include determining a desired effective steering angle based on a desired path of a vehicle, measuring a front road wheel angle and a rear road wheel angle, determining an actual effective steering angle, determining an effective steering angle error based on the desired effective steering angle and the actual effective steering angle, generating a torque command for an electronic power steering system based on the effective steering angle error, and controlling an active rear steering system independently from the electronic power steering system.

The system may include one or more of the following optional aspects or steps. For example, determining the actual effective steering angle can further include evaluating a difference between the front road wheel angle and the rear road wheel angle.

According to at least one aspect, determining the effective steering angle error further includes determining a difference between the desired effective steering angle and the actual effective steering angle.

According to another aspect, controlling the active rear steering system can further include disabling the active rear steering system if an advanced driver assistance system is enabled and either: (i) a rear road wheel angle is less than a first threshold or (ii) the vehicle has a velocity less than a second threshold.

According to yet another configuration, a vehicle management system is provided and includes an advanced driver assistance system for maintaining control of a vehicle, an active rear steering system, and an active rear steering compensation module system including a feature state module. The vehicle management system further includes a computing system including data processing hardware and memory hardware in communication with the data processing hardware, the memory hardware storing instructions that, when executed on the data processing hardware, cause the data processing hardware to perform operations. The operations include determining a desired effective steering angle based on a desired path of the vehicle, measuring a front road wheel angle and a rear road wheel angle, determining an actual effective steering angle, determining an effective steering angle error based on the desired effective steering angle and the actual effective steering angle, generating a torque command for an electronic power steering system based on the effective steering angle error, and controlling an active rear steering system independently from the electronic power steering system.

The vehicle management system may include one or more of the following optional aspects or steps. For example, determining the actual effective steering angle can further include evaluating a difference between the front road wheel angle and the rear road wheel angle. Determining the effective steering angle error can further include determining a difference between the desired effective steering angle and the actual effective steering angle.

According to at least one aspect, the feature state module can be configured to control the state of the active rear steering system. The active rear steering system can be disabled if the advanced driver assistance system is enabled and either: (i) a rear road wheel angle is less than a first threshold or (ii) the vehicle has a velocity less than a second threshold. The state of the active rear steering system can remain unchanged if the advanced driver assistance system is enabled and the rear road wheel angle is greater than a first threshold and the velocity of the vehicle is greater than a second threshold.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
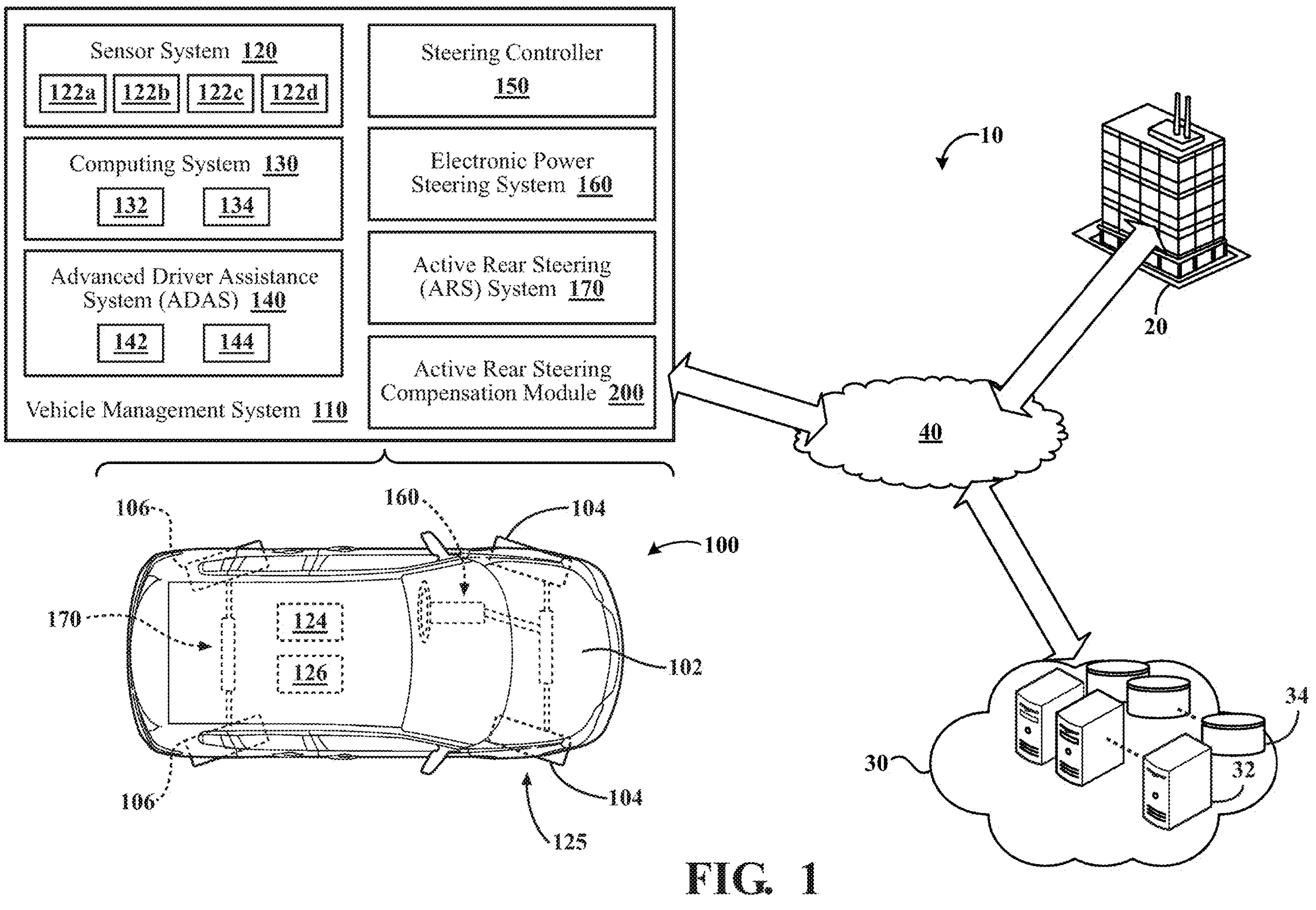
FIG. 1 is a schematic diagram of a vehicle environment including a vehicle management system according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 40 (e.g., the Internet, cellular networks).

The vehicle operating environment 10 includes a vehicle 100. The vehicle 100 includes a vehicle body 102 coupled to one or more front wheels 104 and one or more rear wheels 106. The vehicle 100 also includes a vehicle management system 110 including a sensor system 120, a computing system 130, an advanced driver assistance system (ADAS) 140, a steering controller 150, an electronic power steering (EPS) system 160, an active rear steering (ARS) system 170, and an active rear steering compensation module 200. The vehicle management system 110 may be configured to gather information from the vehicle 100 and/or from a driver (i.e., an operator) and improve ADAS control during manual and automated driving.

While the vehicle 100 maneuvers about the environment 10, the sensor system 120 includes various sensor subsystems 122, 122*a*-122*d* configured to gather sensor data 123, 123*a*-123*d* relating to characteristics of the environment 10 and/or a status of the vehicle 100. For instance, the sensor subsystems 122 include an electronic power steering sensor subsystem 122*a* configured to measure or obtain front steering system data 123*a* such as front road wheel angle and/or hand wheel angle. The sensor subsystems 122 also includes an active rear steering sensor subsystem 122*b* configured to measure or obtain rear steering data 123*b* such as rear road wheel angle. The sensor subsystems 122 can further include an ADAS sensor subsystem 122*c* configured to measure or obtain vehicle operating and/or position data 123*c*. The ADAS sensor subsystem 122*c* can include an inertial measurement unit (IMU) 124, one or more wheel speed sensors 125, one or more cameras 126, and other sensors for obtaining vehicle operating data 123*c*. The sensor subsystems 122 can also include a vehicle exterior sensor subsystem 122*d* configured to measure or obtain external environmental data 123*d*, such as weather or surrounding objects (e.g., vehicles, pedestrians). The vehicle exterior sensor subsystem 122*d* can include one or more of an RGB camera, an infrared camera, a thermal camera, a radar, and/or an external microphone, for example.

As the sensor system 120 gathers the sensor data 123, the computing system 130 is configured to store, process, and/or communicate the sensor data 123 within the vehicle operating environment 10. In order to perform computing tasks related to the sensor data 123, the computing system 130 of the vehicle 100 includes data processing hardware 132 and memory hardware 134. The data processing hardware 132 is configured to execute instructions stored in the memory hardware 134 to perform computing tasks related to operation and management of the vehicle 100. Generally speaking, the computing system 130 refers to one or more locations of data processing hardware 132 and/or memory hardware 134.

In some examples, the computing system 130 is a local system located on the vehicle 100. When located on the vehicle 100, the computing system 130 may be centralized (i.e., in a single location/area on the vehicle 100), decentralized (i.e., located at various locations about the vehicle 100), or a hybrid combination of both (e.g., with a majority of centralized hardware and a minority of decentralized hardware). To illustrate some differences, a decentralized computing system 130 may allow processing to occur at an activity location while a centralized computing system 130 may allow for a central processing hub that communicates to systems located at various positions on the vehicle 100.

Additionally or alternatively, the computing system 130 includes computing resources that are located remotely from the vehicle 100. For instance, the computing system 130 may communicate via the network 40 with a remote vehicle computing system 30 (e.g., a remote computer/server or a cloud-based environment). Much like the computing system 130, the remote vehicle computing system 30 includes remote computing resources such as remote data processing hardware 32 and remote memory hardware 34. Here, sensor data 123 or other processed data (e.g., data processing locally by the computing system 130) may be stored in the remote vehicle computing system 30 and may be accessible to the computing system 130. In some examples, the computing system 130 is configured to utilize the remote resources 32, 34 as extensions of the computing resources 132, 134 such that resources of the computing system 130 may reside on resources of the remote vehicle computing system 30.

Figure 2:
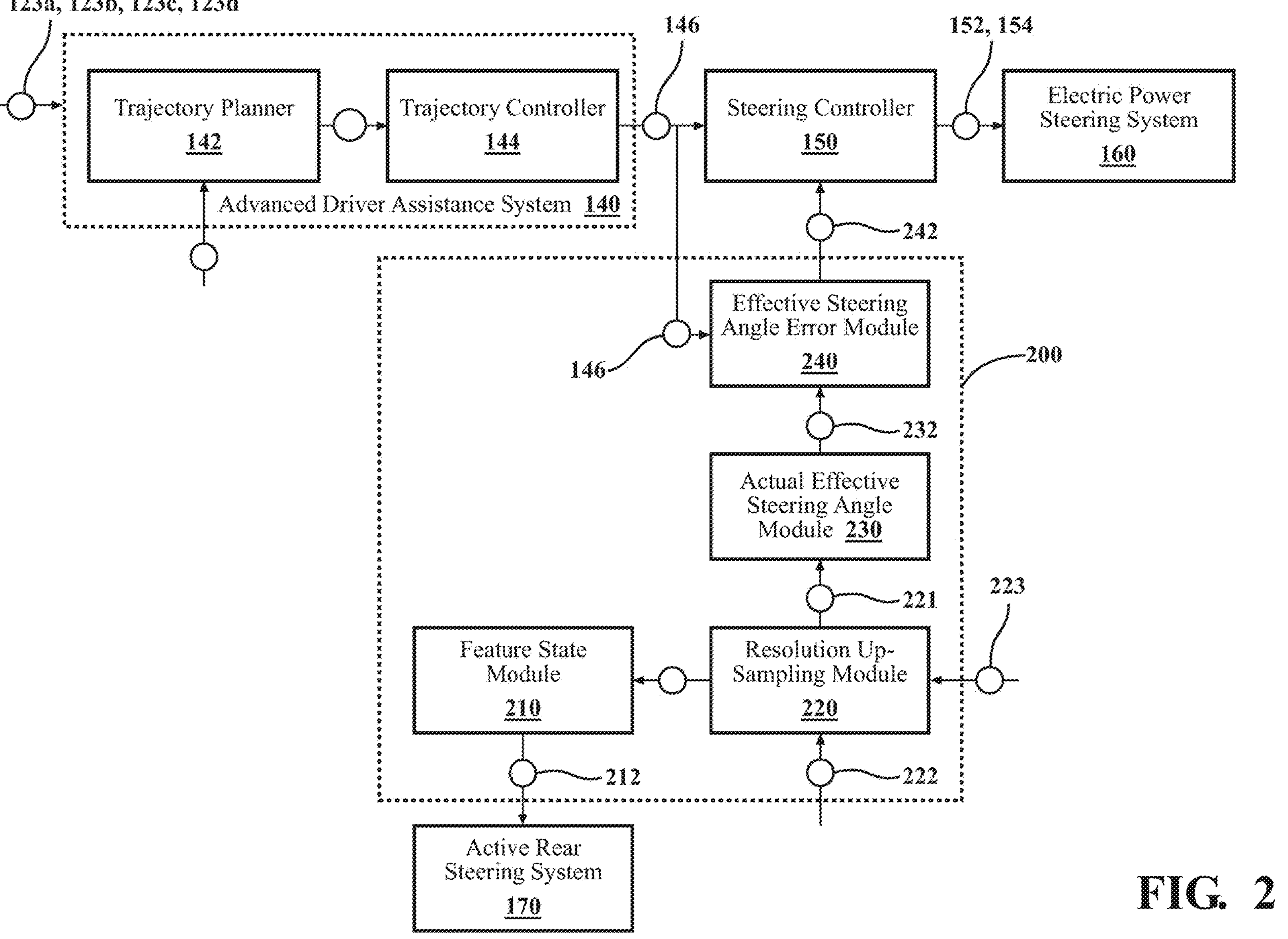
FIG. 2 is an enlarged schematic diagram showing an example of the vehicle management system according to the principles of the present disclosure.

With reference to FIGS. 1 and 2, the vehicle management system 110 includes the advanced driver assistance system (ADAS) 140 which is capable of monitoring and controlling one or more electronic aspects of the vehicle 100. The ADAS 140 can monitor and control one or more subsystems of the vehicle 100. For instance, as discussed in more detail below, the ADAS 140 can communicate with the steering controller 150 and the EPS system 160 to maintain control of the vehicle 10. The ADAS can be configured to receive data from the active rear steering system and adapt the steering of the front wheels 104, for example. According to at least one aspect of the present disclosure, the ADAS 140 can include one or more modules for evaluating and/or storing sensor data 123 of the sensor system 120 and provide instructions to one or more of the systems (e.g., the steering controller 150 and the EPS system 160) of the vehicle 100 to maintain good trajectory following when the active rear steering system is enabled. For instance, the ADAS 140 may include a trajectory planner 142 and a trajectory controller 144.

The trajectory planner 142 and the trajectory controller 144 can be configured to receive data 123, 123*a*-123*d* from one or more of the sensor subsystems 122, 122*a*-122*d* and calculate a desired effective steering angle (i.e., a difference between front road wheel angle and rear road wheel angle) 146 based on a desired path. The desired effective steering angle 146 can be provided to the steering controller 150 so that a torque command 152 can be calculated for the EPS 160. In general, the EPS system 160 can receive the torque command 152 and adjust the road wheel angle of the front wheels 104 accordingly.

With continued reference to FIGS. 1 and 2, the vehicle management system includes the ARS system 170 which can be configured to control steering (i.e., a rear road wheel angle) of the rear wheels 106. More particularly, the ARS system 170 can independently control the steering of the rear wheels 106. The ARS system 170 may be enabled or disabled via a feature state module 210 of the active rear steering compensation module 200. In other words, a state signal 212 can be communicated to inhibit or disable the ARS system 170.

Ordinarily, when the ADAS 140 is enabled during manual or automated driving scenarios, the ARS system 170 is disabled (i.e., the rear road wheel angle of the rear wheels 106 is driven to zero). According to at least one aspect of the present disclosure, the ARS compensation module 200 can be configured to receive data from the ARS system 170 and the EPS system 160 so that the ARS system 170 is selectively controlled while the ADAS 140 is controlling the vehicle 100 during automated or manual driving.

Figure 3:
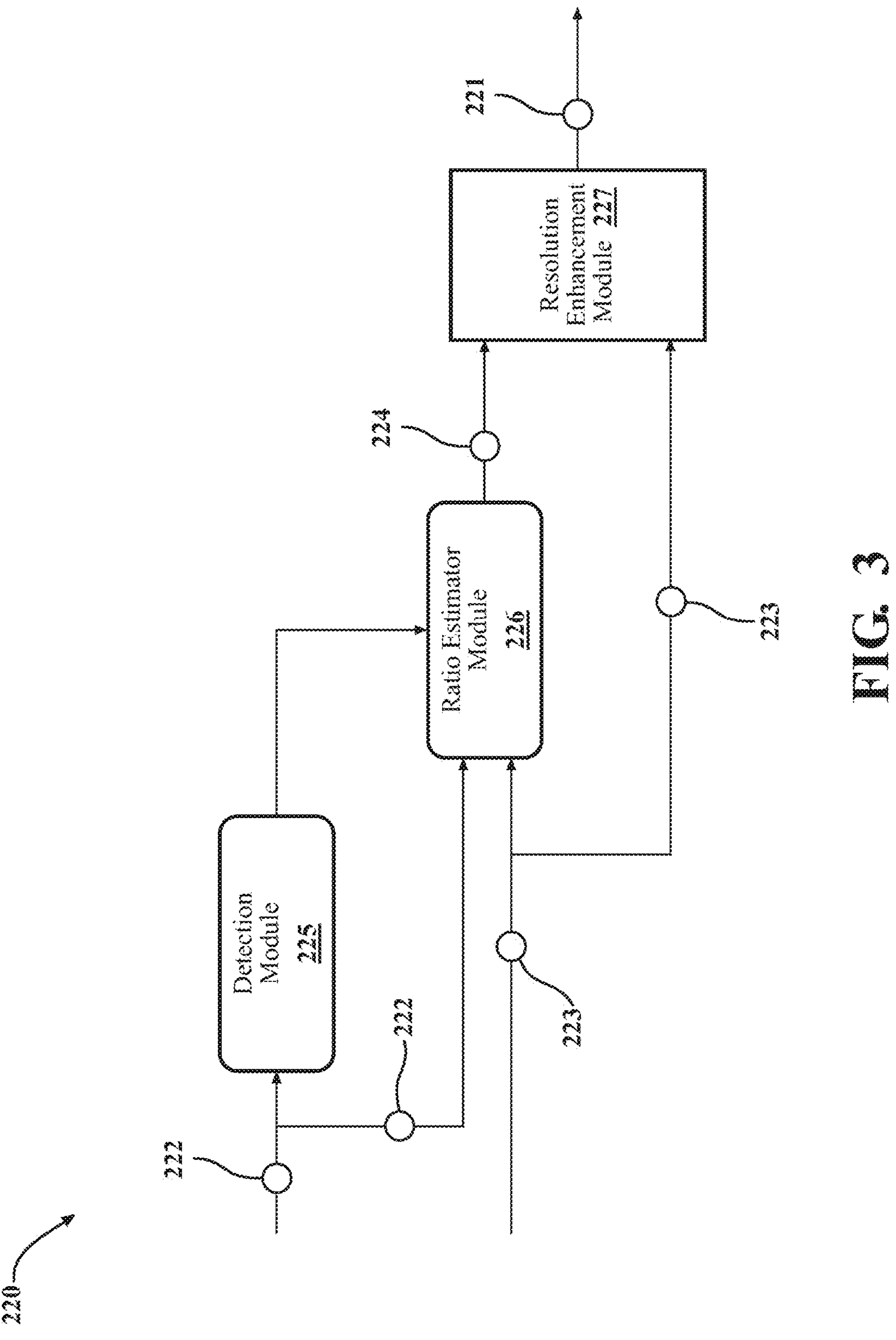
FIG. 3 is a schematic diagram of a resolution up-sampling module according to the principles of the present disclosure.

With reference to FIG. 2, the ARS compensation module 200 can further include a resolution up-sampling module 220, an actual effective steering angle module 230, and an effective steering angle error module 240. With reference to FIG. 3, the resolution up-sampling module 220 can be configured to generate a high resolution rear road wheel angle 221. For instance, the resolution up-sampling module 220 can use a low resolution measurement of the rear road wheel angle 222, a measurement of a steering wheel angle (i.e., hand wheel angle) 223, and a predictive ratio 224 and provide the high resolution rear road wheel angle 221. According to at least one aspect of the present disclosure, the low resolution measurement of the rear road wheel angle 222 can be gathered from the sensor data 123*b* of the active rear steering sensor subsystem 122*b* and the measurement of the steering wheel angle 223 can be gathered from the sensor data 123*a* of the electronic power steering subsystem 122*a*. The low resolution measurement of the rear road wheel angle 222 can be evaluated by a detection module 225 to enable a ratio estimator module 226. For instance, the detection module 225 can evaluate the low resolution measurement of the rear road wheel angle 222 to determine if the data comprises a rising edge, a positive value, a falling edge, and/or a negative value. The ratio estimator module 226 can evaluate the low resolution measurement of the rear road wheel angle 222 and the measurement of the steering wheel angle 223 and provide the predictive ratio 224 to a resolution enhancement module 227. The resolution enhancement module 227 can consider the predictive ratio 224 and the measurement of the steering wheel angle 223 and provide the high resolution road wheel angle 221.

With reference again to FIG. 2, the actual effective steering module 230 can evaluate an actual effective steering angle 232 by taking a difference of either the measured low resolution rear road wheel angle 222 or the high resolution rear road wheel angle 221 and the measured front road wheel angle. The actual effective steering angle 232 can be provided to the effective steering angle error module 240 so that an effective steering angle error 242 can be calculated. The effective steering angle error 242 can be determined by taking a difference between the desired effective steering angle 146 and the actual effective steering angle 232.

The effective steering angle error 242 can be provided to the steering controller 150 so that an adjusted torque command 154 that compensates for the ARS system 170 can be generated for the EPS system 160.

Figure 4:
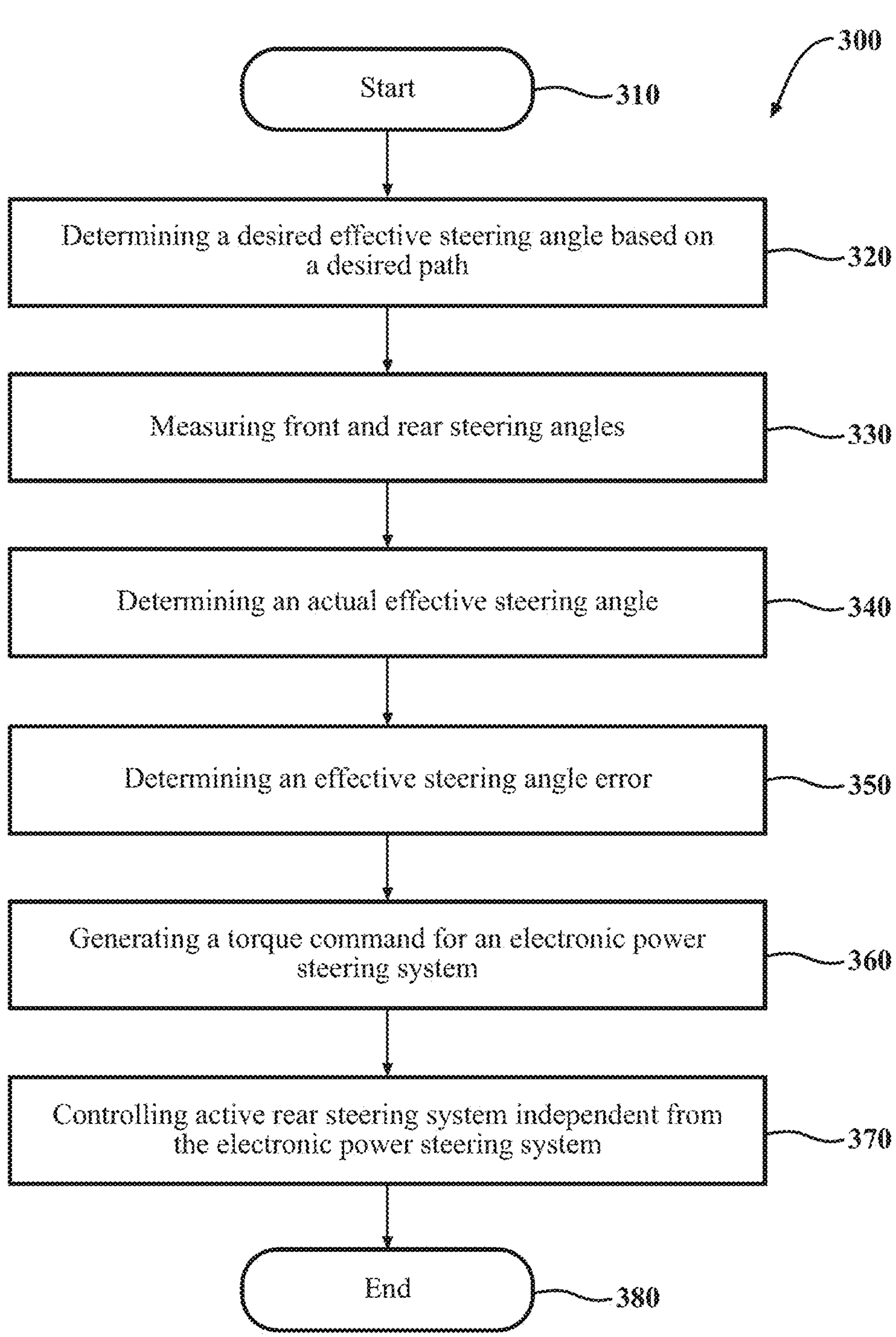
FIG. 4 is a flow diagram showing operations of the vehicle management system of FIG. 2.

With reference to FIG. 4, a method 300 of lane centering control of the vehicle 100 equipped with the ARS system 170 is provided. At 310, the method 300 is initiated. In practical terms, the method 300 can be initiated upon powering up of the vehicle 100 by the operator.

At 320, the desired effective steering angle 146 can be determined based on the desired path of the vehicle 100. In other words, the trajectory planner 142 of the ADAS 140 can be configured to provide the desired effective steering angle 146.

At 330, the front road wheel angle and the rear road wheel angle are measured. The front and rear road wheel angles can be gathered using one more of the sensors of the ADAS sensor subsystem 122*c* and the active rear steering sensor subsystem 122*b*, for example. As will be discussed in further detail below, the measured rear road wheel angle 222 (i.e., a low resolution rear road wheel angle) can be enhanced to the high resolution road wheel angle 221.

At 340, the actual effective steering angle 232 can be determined at the actual effective steering angle module 230. As indicated above, the actual effective steering angle 232 can be determined by taking the difference of either the measured low resolution rear road wheel angle 222 or the high resolution rear road wheel angle 221 and the measured front road wheel angle.

At 350, the effective steering angle error can be determined using the effective steering angle error module 240. The effective steering angle error module 240 can be configured to take the difference between desired effective steering angle 146 and the actual effective steering angle 232.

At 360, the adjusted torque command 154 can be generated for the EPS system 160 that accounts for the effective steering angle error 242. In practical terms, the adjusted torque command 154 accounts for the control of the ARS system 170 and can be received by the EPS to adjust the road wheel angle of the front wheels 104.

At 370, the ARS system 170 continues to control the rear road wheel angle of the rear wheels 106 independent of the EPS system 160.

At 380, the method 300 ends.

Figure 5:
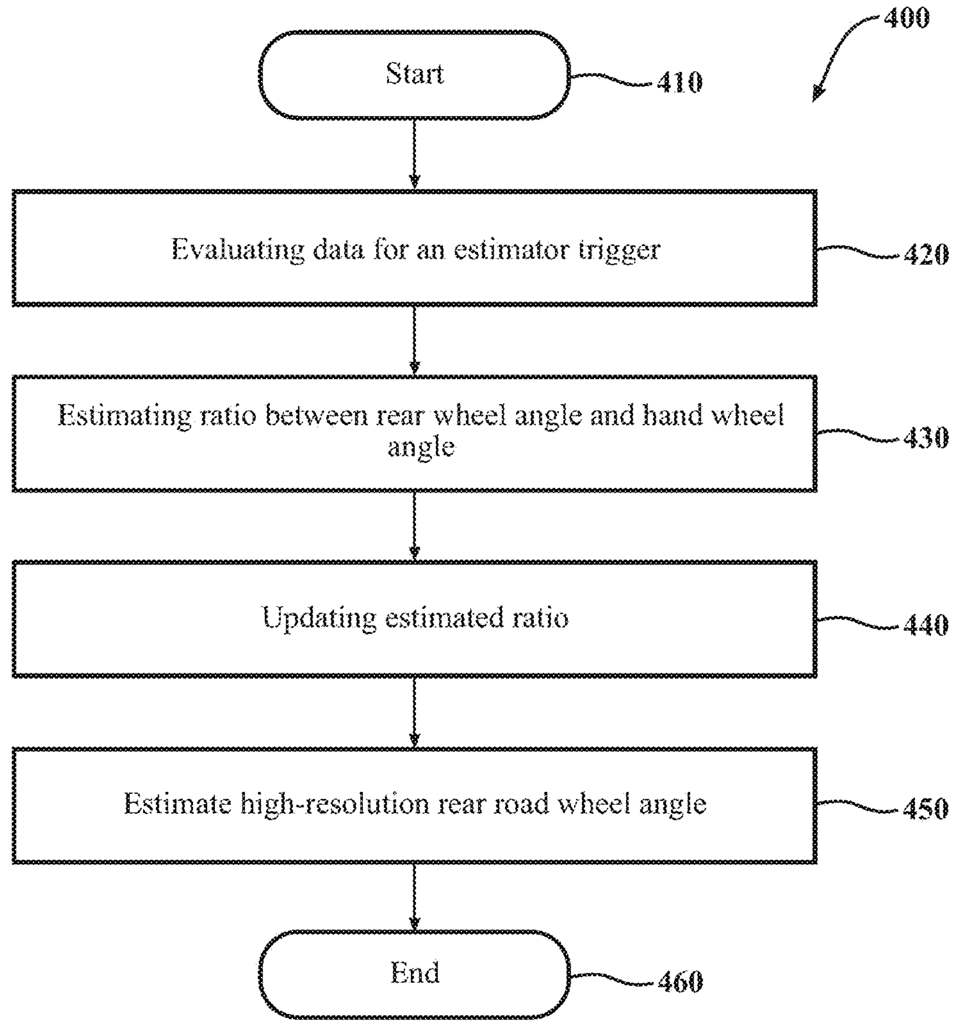
FIG. 5 is a flow diagram showing operations of the resolution up-sampling module of FIG. 3.

With reference to FIG. 5, a method 400 of resolution up-sampling the low resolution rear road wheel angle 222 to the high resolution rear road wheel angle 221 is provided. At 410, the method 400 is initiated. In practical terms, the method 400 can be initiated simultaneously with gathering of the low resolution road wheel angle 222 (FIG. 3) using one or more sensors of the active rear steering sensor subsystem 122*b*.

At 420, the detection module 225 (FIG. 3) evaluates the low resolution road wheel angle 222 and can trigger and/or communicate with the ratio estimator module 226 when there is a rising edge, a positive value, a falling edge, and/or a negative value in the low resolution rear road wheel angle 222. In another configuration, other values or patterns can be used to trigger the ratio estimator module 226.

At 430, the ratio estimator module 226 can be configured to provide the predictive ratio 224. In general, the predictive ratio 224 is an instantaneous ratio that accounts for the measured rear road wheel angle 222 and the steering wheel angle 223. According to at least one aspect, a filtering gain can be applied to the predictive ratio 224.

At 450, the resolution enhancement module 227 can be configured to instantaneously estimate the high resolution rear road wheel angle 221. According to one aspect, the high resolution rear road wheel angle 221 can be estimated by taking the product of the predictive ratio 224 and the hand wheel angle 223.

The high resolution rear road wheel angle 221 can be used downstream by the steering controller 150, for example. According to at least one configuration, if there is a significant change in vehicle speed since the last time the ratio estimator module 226 was triggered, a look-up table may be used to reinitialize the predictive ratio 224.

At 460, the method 400 ends.

Figure 6:
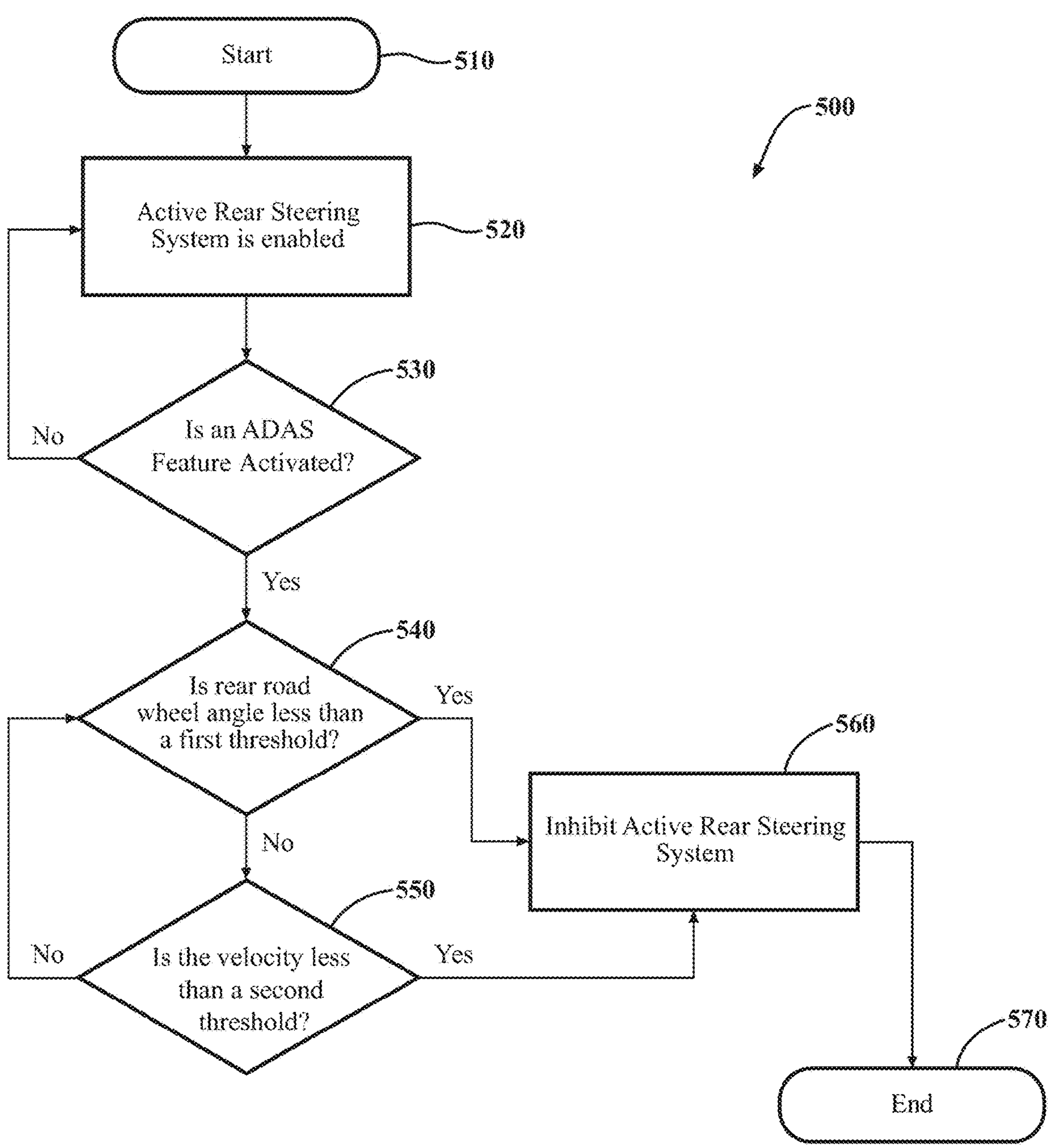
FIG. 6 is a flow diagram showing operations of the vehicle management system of FIG. 2.

With reference to FIG. 6, a method 500 is provided for dynamically controlling the state (i.e., enabled or disabled) of the ARS system 170. Method 500 can be desirable to maintain good trajectory following while the vehicle is traveling along a curve in the road, for example. At 510, the method 500 is initiated. In practical terms, the method 500 can be initiated upon powering up of the vehicle 100 by the operator.

At 520, the ARS system 170 is enabled. The active rear steering system may be activated or enabled upon powering up of the vehicle 100 or by the operator while the vehicle is at rest or is traveling at a low speed.

At 530, if one or more features of the ADAS 140 is enabled then the method 500 proceeds to 540. If one or more features of the ADAS 140 is disabled then the method 500 returns to 520.

At 540, if the rear road wheel angle is less than a first threshold then the method proceeds to 560. If the rear road wheel angle is greater than a first threshold then the method proceeds to 550.

At 550, if the velocity of the vehicle 100 is less than a second threshold then the method proceeds to 560. If the velocity of the vehicle 100 is greater than the second threshold then the method 500 returns to 540.

At 560, the active rear steering system is disabled (i.e., inhibited).

At 570, the method 500 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:
- determining a desired effective steering angle based on a desired path of a vehicle;
- measuring a front road wheel angle and a rear road wheel angle, wherein the rear road wheel angle is a low resolution rear road wheel angle;
- measuring a hand wheel angle;
- estimating a high resolution rear road wheel angle using the low resolution rear road wheel angle, the hand wheel angle, and a predictive ratio;
- determining an actual effective steering angle;
- determining an effective steering angle error based on the desired effective steering angle and the actual effective steering angle;
- generating a torque command for an electronic power steering system based on the effective steering angle error; and
- controlling an active rear steering system independently from the electronic power steering system.

2. The method of claim 1, wherein determining the actual effective steering angle further comprises evaluating a difference between the front road wheel angle and the high resolution rear road wheel angle.

3. The method of claim 1, wherein determining the actual effective steering angle further comprises evaluating a difference between the front road wheel angle and the low resolution rear road wheel angle.

4. The method of claim 1, wherein determining the effective steering angle error further comprises determining a difference between the desired effective steering angle and the actual effective steering angle.

5. The method of claim 1, wherein the active rear steering system is configured to be selectively controlled while an advanced driver assistance system is enabled.

6. The method of claim 5, wherein controlling the active rear steering system further comprises disabling the active rear steering system if the advanced driver assistance system is enabled and either: (i) the rear road wheel angle is less than a first threshold or (ii) the vehicle has a velocity less than a second threshold.

7. The method of claim 1, further comprising adjusting the front road wheel angle of one or more front wheels of the vehicle based on the torque command.

8. A system comprising:
- data processing hardware; and
- memory hardware in communication with the data processing hardware, the memory hardware storing instructions that, when executed on the data processing hardware, cause the data processing hardware to perform operations comprising:
  - determining a desired effective steering angle based on a desired path of a vehicle;
  - measuring a front road wheel angle and a rear road wheel angle, wherein the rear road wheel angle is a low resolution rear road wheel angle;
  - measuring a hand wheel angle;
  - estimating a high resolution rear road wheel angle using the low resolution rear road wheel angle, the hand wheel angle, and a predictive ratio;
  - determining an actual effective steering angle;
  - determining an effective steering angle error based on the desired effective steering angle and the actual effective steering angle;
  - generating a torque command for an electronic power steering system based on the effective steering angle error; and
  - controlling an active rear steering system independently from the electronic power steering system.

9. The system of claim 8, wherein determining the actual effective steering angle further comprises evaluating a difference between the front road wheel angle and the low resolution rear road wheel angle.

10. The system of claim 8, wherein determining the effective steering angle error further comprises determining a difference between the desired effective steering angle and the actual effective steering angle.

11. The system of claim 8, wherein controlling the active rear steering system further comprises disabling the active rear steering system if an advanced driver assistance system is enabled and either: (i) the rear road wheel angle is less than a first threshold or (ii) the vehicle has a velocity less than a second threshold.

12. A vehicle management system comprising:
- an advanced driver assistance system for maintaining control of a vehicle;
- an active rear steering system, wherein the active rear steering system is disabled if the advanced driver assistance system is enabled and either: (i) a rear road wheel angle is less than a first threshold or (ii) the vehicle has a velocity less than a second threshold, and wherein a state of the active rear steering system is unchanged if the advanced driver assistance system is enabled and the rear road wheel angle is greater than the first threshold and the velocity of the vehicle is greater than the second threshold;
- an active rear steering compensation module system comprising a feature state module, wherein the feature state module is configured to control the state of the active rear steering system; and
- a computing system, comprising:
  - data processing hardware; and
  - memory hardware in communication with the data processing hardware, the memory hardware storing instructions that, when executed on the data processing hardware, cause the data processing hardware to perform operations comprising:
- determining a desired effective steering angle based on a desired path of the vehicle;
- measuring a front road wheel angle and the rear road wheel angle;
- determining an actual effective steering angle;
- determining an effective steering angle error based on the desired effective steering angle and the actual effective steering angle;
- generating a torque command for an electronic power steering system based on the effective steering angle error; and
- controlling an active rear steering system independently from the electronic power steering system.

13. The vehicle management system of claim 12, wherein determining the actual effective steering angle further comprises evaluating a difference between the front road wheel angle and the rear road wheel angle.

14. The vehicle management system of claim 13, wherein determining the effective steering angle error further comprises determining a difference between the desired effective steering angle and the actual effective steering angle.

15. The method of claim 1, wherein estimating the high resolution rear road wheel angle includes evaluating the low resolution rear road wheel angle using a detection module that triggers a ratio estimator module when the low resolution rear road wheel angle has at least one of a rising edge, a positive value, a falling edge, and a negative value.

16. The method of claim 1, wherein the predictive ratio is an instantaneous ratio that accounts for the low resolution rear road wheel angle and the hand wheel angle, and wherein the high resolution rear road wheel angle is estimated by taking a product of the predictive ratio and the hand wheel angle.

17. The method of claim 1, further comprising reinitializing the predictive ratio using a look-up table if there is a significant change in vehicle speed.

18. The vehicle management system of claim 12, further comprising estimating a high resolution rear road wheel angle including evaluating a low resolution rear road wheel angle using a detection module that triggers a ratio estimator module when the low resolution rear road wheel angle has at least one of a rising edge, a positive value, a falling edge, and a negative value.

19. The vehicle management system of claim 18, wherein estimating a high resolution rear road wheel angle includes estimating the high resolution rear road wheel angle using a predictive ratio, the predictive ratio being an instantaneous ratio that accounts for a low resolution rear road wheel angle and a hand wheel angle, and wherein the high resolution rear road wheel angle is estimated by taking a product of the predictive ratio and the hand wheel angle.

20. The vehicle management system of claim 19, further comprising reinitializing the predictive ratio using a look-up table if there is a significant change in vehicle speed.

* * * * *